Feb. 8, 1955    J. PERRELLI    2,701,594
FREESTONE DRUPE PITTER AND FEED DEVICE
Filed June 13, 1950    3 Sheets-Sheet 2

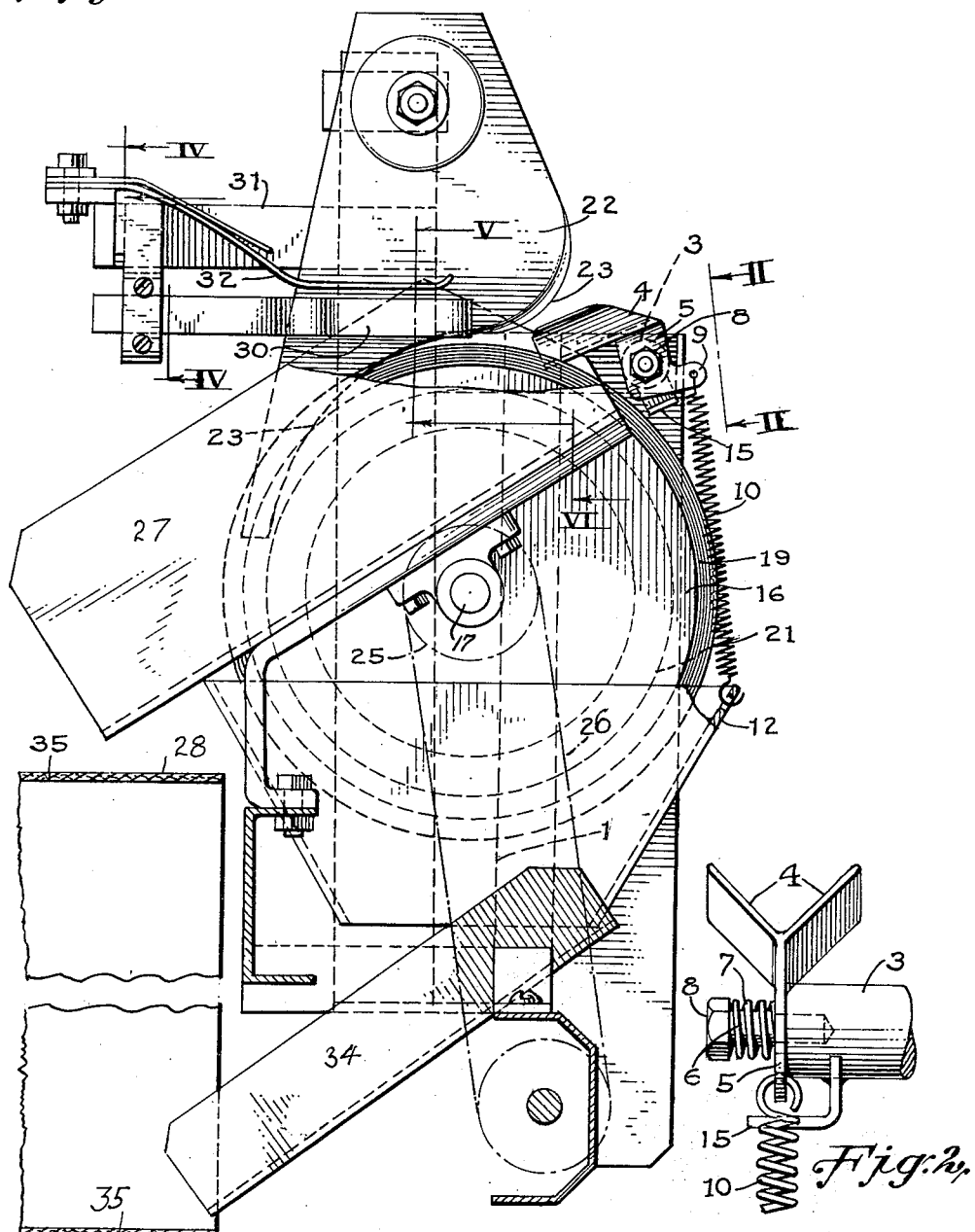

INVENTOR.
JOHN PERRELLI.
BY
*Baylun, Molder & Beckley*
ATTORNEYS.

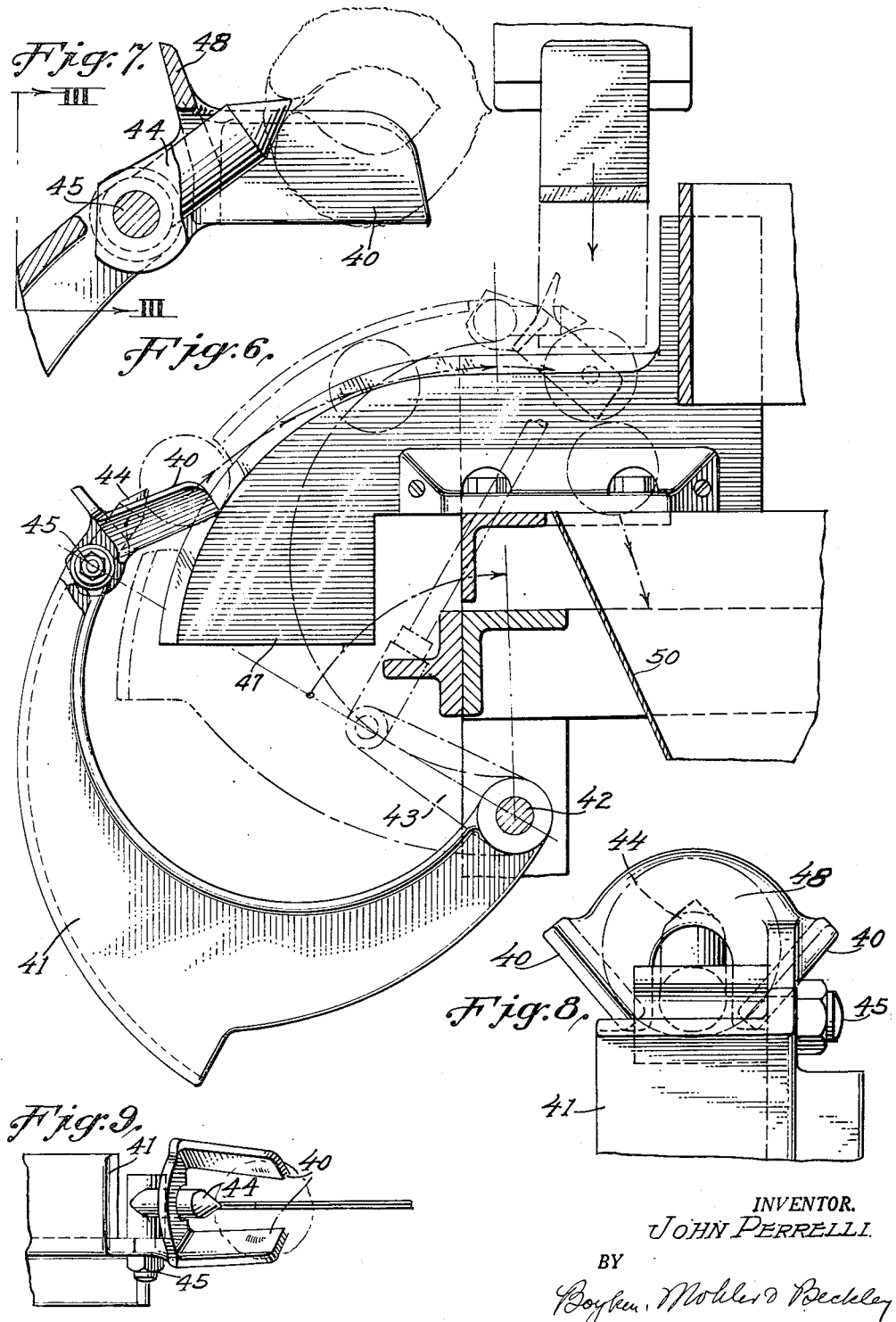

United States Patent Office 2,701,594
Patented Feb. 8, 1955

2,701,594

FREESTONE DRUPE PITTER AND FEED DEVICE

John Perrelli, Richmond, Calif., assignor to Perrelli Freestone Machine Inc., Richmond, Calif., a corporation of California Application June 13, 1950, Serial No. 167,848

4 Claims. (Cl. 146—28)

This invention relates to an improvement in a freestone drupe pitting machine of generally the type disclosed in United States Letters Patent No. 2,474,492 to Joseph Perrelli and John Perrelli and dated June 28, 1949.

One of the principal objects of this invention is the provision of an improved feed device for freestone drupes, such as apricots and peaches, that enables a faster and more accurate feed of fruit to the halving knife.

Another object of the invention is the provision of an improved feed device in association with the cutting blade for facilitating the halving of drupes having different sized pits, and which feed device is so arranged relative to the other fruit supporting elements that are in the pitting machine to effect a better pitting operation.

In pitting machines for freestone drupes, such as apricots and peaches, it is desirable that the fruit be halved in the plane of the suture of the pit, and this suture is coplanar with that of the fruit. In normal freestone drupes if the fruit is halved on the plane of the suture thereof, the pits readily fall from the fruit, which would not occur were the fruit separated in a plane that was to one side or the other of that of the suture. The plane of the suture bisects the fruit.

The present feed device not only insures a perfect bisection of fruit irrespective of whether it is bisected in the plane of the suture or in a plane extending transversely thereof. Thus an error on the part of the operator will not result in unequal halves. However, in a pitting machine of the type noted in said patent, it is highly desirable that the edge of the pit of each fruit, which defines the suture of the pit, be in the plane of the halving blade since the fruit is rolled about an axis perpendicular to the plane of its suture with said edge in engagement with the cutting edge of said blade, during the halving operation.

One of the objects of this invention is the combination of the cutting blade and feed device whereby such halving of the fruit is accurate, safe and fast.

Other objects will appear in the description and in the drawings.

In the drawings,

Fig. 1 is a side elevational view of the freestone pitter, part of the support and the pit and fruit conveyor being in cross section.

Fig. 2 is an enlarged view of the feeding device as seen from the feed side of the machine.

Fig. 6 is a modified form of feed device as seen from one side, and partly in section.

Fig. 7 is an enlarged sectional view taken through the feed device.

Fig. 8 is a rear end view of the feed device of Fig. 7.

Fig. 9 is a top plan view of the device of Figs. 7, 8.

Figure 3:
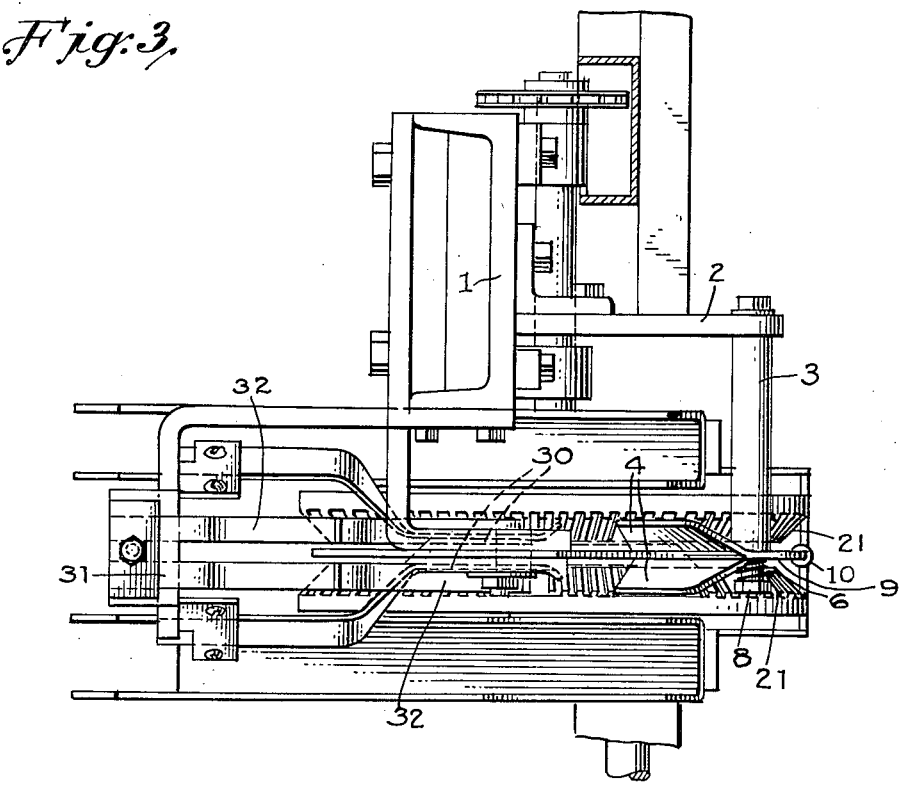
Fig. 3 is a top plan view of the pitter.
Figure 4:
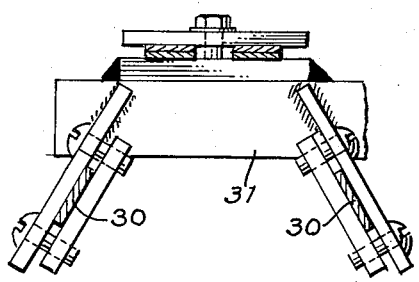
Fig. 4 is an enlarged sectional view taken along line 4—4 of Fig. 1.
Figure 5:
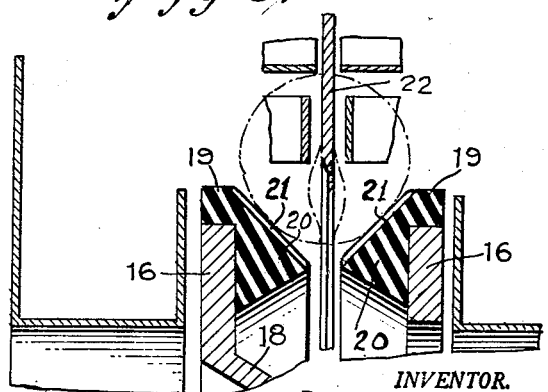
Fig. 5 is an enlarged fragmentary sectional view taken along line 5—5 of Fig. 1.

In detail, referring to the form of the invention as seen in Figs. 1 to 5 inclusive, the pitter comprises a frame that includes a vertical post 1 that has a laterally extending bracket 2 (Fig. 3) secured thereto, and which bracket carries a horizontal frame member 3 projecting laterally therefrom. This frame member 3 carries a generally V-shaped trough 4 at its outer end (Fig. 2). A vertical strip 5 depends from the lower apex of the trough, being preferably integral with said trough along said apex, and said strip is horizontally apertured for a shouldered screw 6 that extends through the aperture in strip 5 and into the end of the frame member 3. A coil or helical spring 7 reacts between the head 8 of said screw and said strip for yieldably holding said strip vertical and against the outer end of member 3. The screw also provides a pivot about which the strip and trough may partially rotate.

The lower end of strip 5 is provided with a rearwardly projecting portion 9 (Fig. 1) for connection with the upper end of a downwardly tensioned helical or coil spring 10, and the lower end of said spring is suitably anchored to an element 12 that is rigid with the frame of the machine. A horizontal stop member 15 extends below the lower end of the strip 5 for limiting the rocking movement of the trough, said member being spaced a little below the portion 9.

The strip 5 depends from the rear end of trough 4, it being understood that the words rear, rearwardly, forward, forwardly and words of similar meanings refer to the direction of movement of the fruit through the machine, which is away from the operator. The operator thus stands at the rear end of trough 4, and places fruit into the latter for "forward" movement of the fruit into the pitter.

The strip 5 depends from the rear end of trough 4 and as projection 9 extends rearwardly from the strip 5, it will be seen that the spring 10 will tend to hold the forward end of the trough elevated. However, the lower end of the strip 5 adjacent projection 9 will engage the edge of member 15 when the trough is in a downwardly and forwardly inclined position preventing further elevation of the forward end of said trough, but a predetermined downward pressure on the forward end of said trough will cause the forward end of the latter to move downwardly against the resistance of spring 10.

The apex of the V of the trough is lowermost, and the forward end of this apex extends into the space between a pair of coaxial, equal diameter, and relatively large annular, spaced rims 16. These rims may have separate hubs, but preferably they have a single hub secured on shaft 17 as shown in the above mentioned patent, and which hub connects with one rim by a conical disc portion 18 that extends across the space between the rims, and spaced spokes or similar connections may secure the other rim to the hub.

The spaced peripheral portions of these rims comprise annular relatively soft resilient rubber strips 19 having oppositely inwardly extending annular portions 20 that are formed to provide similarly inclined outer surfaces 21 that coact to define inclined sides of an outwardly opening generally V-shaped channel around the wheel, except that the apex of the V is open. These inclined surfaces are radially ribbed thus providing a positive antifriction surface that is adapted to engage apricots that are slipped down the trough 5 and into engagement with said ribbed surface. These ribs are indicated at 21 in Fig. 3.

Upon an operator placing an apricot or peach in the trough 4, it will automatically be centered in a plane bisecting the space between the rims 16, so that the rims will simultaneously engage the fruit as it is slipped down the trough and into engagement with the rims. However, just before the fruit would engage the rims, the bisection thereof is started by an arcuately extending downwardly directed cutting edge of an overhead blade 22 that is disposed in the same plane as the one that bisects the space between rims 16, and that extends through the apex of trough 4.

The blade 22 has a curved edge 23 that extends from a point adjacent the forward end of trough 4, and radially outwardly of the rims 16 around the rims and progressively closer to the axis of said rims until it is between the rims. The space between the trough and the edge of the blade adjacent thereto is such that an apricot or peach on said trough being moved toward the blade will be impaled on its upper side by the blade.

The rims 16 are rotated counter-clockwise, as seen in Fig. 1 by any suitable means such as a motor connected with a pulley 25 by belt 26.

The apex of the trough 4 at its forward end extends to a point between the rubber strips 19, the tapered adjacent sides of said strips generally conforming to the inclination of the sides of the trough. By this arrangement, slightly after the fruit is impaled by blade 22, the rims 16 engage the under sides of the fruit at opposite sides of the plane of the blade and the fruit is carried around forwardly by the rims, and is rotated at the same time with the upper edge of the pit in engagement with the blade. As the blade curves progressively closer to the axis of the rims the pit will be forced out of the fruit and radially of said rims past them for dropping onto the disc 18 that will discharge the pits onto a chute 27. Chute 27 in turn discharges the pits onto a conveyor 28 that carries them away.

Upon leaving the trough 4 the fruit halves at opposite sides of the blade are yieldably held against the said opposite sides by rearwardly extending flat spring arms 30. The same bracket 31 that holds the arms 30 also carries spring hold-down arms 32 that yieldably hold the fruit halves against the rim until the pits are free.

As best seen in Fig. 3, the spring arms 30 extend divergently away from the sides of the blade at a point where bisection of the fruit is completed, and the halves will then fall oppositely outwardly into discharge chutes 34 for discharge onto a conveyor 35.

The provision of the spring arms 30, 32 and their relationship to trough 4, blade 22, and rims 16 including the structure of the trough and its relationship to the rims and blade are quite important in the efficiency of the pitter. The spring 10 that is connected with the trough enables the latter to swing away from the blade in the event over-large pits or fruit is fed to the blade, which is also an important feature.

The trough or V-shaped support for the fruit automatically positions the same for a perfect bisecting job, and in Figs. 6 to 9 is a modification of the feeding device in which the V-shaped trough 40 is carried on one end of an arm 41 that in turn is secured at its opposite end to a shaft 42, which shaft is rotatably supported in any suitable bearings for oscillation about its axis. A crank arm 43 (indicated in dot-dash line) may be connected with said shaft and with any suitable source of power for oscillating the arm 41. A pin 44 at the rear end of the trough 40 is adapted to engage the rearwardly facing side of a peach or other drupe and is adjustably secured to a cross bolt 45 for adjustment of its pointed end up and down for engaging the stem ends of the pits in fruit of different sizes.

In the present instance, the V-bottom of the trough is cut away to permit the passage of the curved impaling knife 47 to engage the lower side of the fruit instead of the upper side.

The sides of trough 40 are connected by an upstanding wall 48 that extends across the upper side of pin 44.

In operation, the operator may quickly position a drupe in the trough 40 where it is automatically centered and is impaled on blade 47. The arm 41 is then swung upwardly along a path of travel that corresponds with the curvature of the cutting edge of blade 47, and at the forward end of the stroke of the blade the drupe is positioned below a guillotine type chopping blade that is vertically reciprocated by any suitable means for bisecting the drupe, after the feed trough is retracted. The halves fall into side chutes 50 that deliver them to any suitable point.

I claim:

1. In a pitting machine for pitting apricots and the like; a pair of coaxial rims having their outer peripheral surfaces along their adjacent sides extending divergently outwardly providing a substantially V-shaped rim structure in cross sectional contour, a straight V-shaped trough above said rims extending upwardly and generally tangentially away from the upper sides of said rims with the sides of said trough at opposite sides of a vertical plane disposed midway between said rims and with the lower end of said trough positioned closely adjacent to said rims at a point above said axis whereby an apricot on said trough moved over said lower end will be delivered directly onto the upper sides of said rims, a blade in said plane positioned above said rims and having a curved cutting edge directed generally toward said axis, means supporting said blade with one end of its cutting edge positioned above said lower end of said trough a sufficient distance for impaling said apricot above its pit when such apricot is supported on said lower end and is delivered onto the upper sides of said rims, means for rotating said rims as a unit in direction for moving their upper sides in direction away from the lower end of said trough for carrying apricots so delivered onto said upper sides of said rims from said trough away from the latter and along said curved edge, said rims being circumferentially free from obstructions to rolling of such apricot thereon.

2. In a pitting machine for pitting apricots and the like; a pair of coaxial rims having their outer peripheral surfaces along their adjacent sides extending divergently outwardly providing a substantially V-shaped rim structure in cross sectional contour, a straight V-shaped trough above said rims extending upwardly and generally tangentially away from the upper sides of said rims with the sides of said trough at opposite sides of a vertical plane disposed midway between said rims and with the lower end of said trough positioned closely adjacent to said rims at a point above said axis whereby an apricot on said trough moved over said lower end will be delivered directly onto the upper sides of said rims, a blade in said plane positioned above said rims and having a curved cutting edge directed generally toward said axis, means supporting said blade with one end of its cutting edge positioned above said lower end of said trough a sufficient distance for impaling said apricot above its pit when such apricot is supported on said lower end and is delivered onto the upper sides of said rims, means for rotating said rims as a unit in direction for moving their upper sides in direction away from the lower end of said trough for carrying apricots so delivered onto said upper sides of said rims from said trough away from the latter and along said curved edge, said rims being circumferentially free from obstructions to rolling of such apricot thereon, a pair of horizontally extending and horizontally elongated arms respectively positioned at opposite sides of said blade extending generally away from said one end of said cutting edge and from said trough, means supporting said arms with one of their corresponding ends spaced above said rims a sufficient distance for engaging the upper sides of such apricot when the latter is impaled by said cutting edge.

3. In a pitting machine for pitting apricots and the like; a pair of coaxial rims having their outer peripheral surfaces along their adjacent sides extending divergently outwardly providing a substantially V-shaped rim structure in cross sectional contour, a straight V-shaped trough above said rims extending upwardly and generally tangentially away from the upper sides of said rims with the sides of said trough at opposite sides of a vertical plane disposed midway between said rims and with the lower end of said trough positioned closely adjacent to said rims at a point above said axis whereby an apricot on said trough moved over said lower end will be delivered directly onto the upper sides of said rims, a blade in said plane positioned above said rims and having a curved cutting edge directed generally toward said axis, means supporting said blade with one end of its cutting edge positioned above said lower end of said trough a sufficient distance for impaling said apricot above its pit when such apricot is supported on said lower end and is delivered onto the upper sides of said rims, means for rotating said rims as a unit in direction for moving their upper sides in direction away from the lower end of said trough for carrying apricots so delivered onto said upper sides of said rims from said trough away from the latter and along said curved edge, said rims being circumferentially free from obstructions to rolling of such apricot thereon, means pivotally supporting said trough for partial rotation about a horizontal axis for movement of its lower end toward said rims, and means yieldably holding said lower end spaced a predetermined distance above said rims.

4. In a pitting machine for apricots and the like having a pair of coaxial rims formed with divergently extending peripheral sides to provide a generally V-shaped rim structure in cross sectional contour, means supporting said rims for rotation about a horizontal axis as a unit, a blade disposed in a vertical plane bisecting the said V-shaped rim structure perpendicularly of said axis and having a curved cutting edge directed toward said axis and extending around said rim structure with one end spaced from said rim structure a sufficient distance to enable the pit in an apricot supported on said rim structure to pass between said edge and said rim structure, a pair of generally horizontally directed arms extending along opposite sides of said blade from said one end of said cutting edge, means supporting said arms in a position for engaging the upper side of an apricot impaled by said cutting edge, and a generally V-shaped trough extending below said one end of said cutting edge for delivering an apricot onto said rims and below said arms and to said cutting edge.

References Cited in the file of this patent

UNITED STATES PATENTS

| Number | Name | Date |
|---|---|---|
| 404,517 | Briggs et al. | June 4, 1889 |
| 417,885 | Sanguinetti et al. | Dec. 24, 1889 |
| 517,588 | Rhem | Apr. 3, 1894 |
| 553,649 | Harpold | Jan. 28, 1896 |
| 1,600,567 | Roberts | Sept. 21, 1926 |
| 2,259,332 | Winkelman | Oct. 14, 1941 |
| 2,474,492 | Perrelli et al. | June 28, 1949 |
| 2,525,990 | Wurgaft | Oct. 17, 1950 |